United States Patent [19]

Nussberger

[11] Patent Number: 5,155,893
[45] Date of Patent: Oct. 20, 1992

[54] COUPLING DEVICE FOR USE AS A CLASP OR THE LIKE

[76] Inventor: Werner Nussberger, Rütihof, CH-8439 Böbikon, Switzerland

[21] Appl. No.: 768,371

[22] Filed: Sep. 27, 1991

[30] Foreign Application Priority Data

Oct. 3, 1990 [CH] Switzerland .............. 03183/90
Aug. 22, 1991 [CH] Switzerland .............. 02472/91

[51] Int. Cl.⁵ .............. A44B 17/00; F16B 21/00
[52] U.S. Cl. ......................... 24/597; 24/616; 411/554
[58] Field of Search .......... 24/597, 590, 591, 592, 24/593, 594, 595, 596, 616, 617, 615, 618, 453; 411/554

[56] References Cited

U.S. PATENT DOCUMENTS

| 807,069 | 12/1905 | Geoffroy | 24/616 |
|---|---|---|---|
| 874,957 | 12/1907 | Godley | 24/615 |
| 885,267 | 4/1908 | Martel | 24/616 |
| 926,602 | 6/1909 | Pollock | 24/616 |
| 1,199,690 | 9/1916 | Gillan | 24/597 |
| 2,996,781 | 8/1961 | Oliveau | 24/592 |
| 3,165,804 | 1/1965 | Marosy | 24/616 |
| 3,487,512 | 1/1970 | Marosy | 24/597 |
| 3,540,091 | 11/1970 | Marosy | 24/597 |
| 4,358,876 | 11/1982 | Colognori | 24/616 |

FOREIGN PATENT DOCUMENTS 3840170 5/1990 Fed. Rep. of Germany .
1008818 5/1952 France .................. 24/590

Primary Examiner—Victor N. Sakran
Attorney, Agent, or Firm—Peter K. Kontler

[57] ABSTRACT

A coupling device which can be used as a clasp to connect the ends of chains, bracelets, necklaces or other articles of jewelry has a male component including a shank which can be inserted into the passage of a tubular or disc-shaped female component whereby the shoulders at the rear side of the front end portion of the shank engage adjacent shoulders of the female component to prevent unintentional extraction of the shank. The shank or the female component has one or more resilient sections which can be engaged and deformed by one or more stressing portions of the other component in response to rotation of at least one component relative to the other component to thus ensure that the size of the passage is temporarily increased or the dimensions of the front end portion of the shank are reduced in order to permit extraction of the shank from the female component.

16 Claims, 4 Drawing Sheets

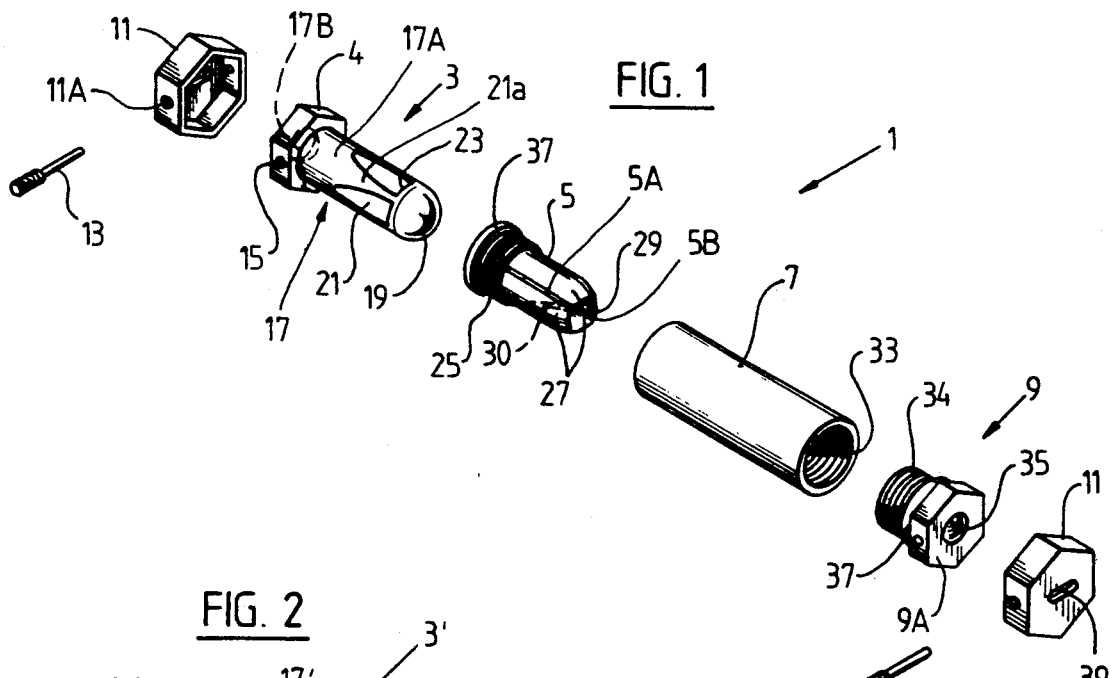
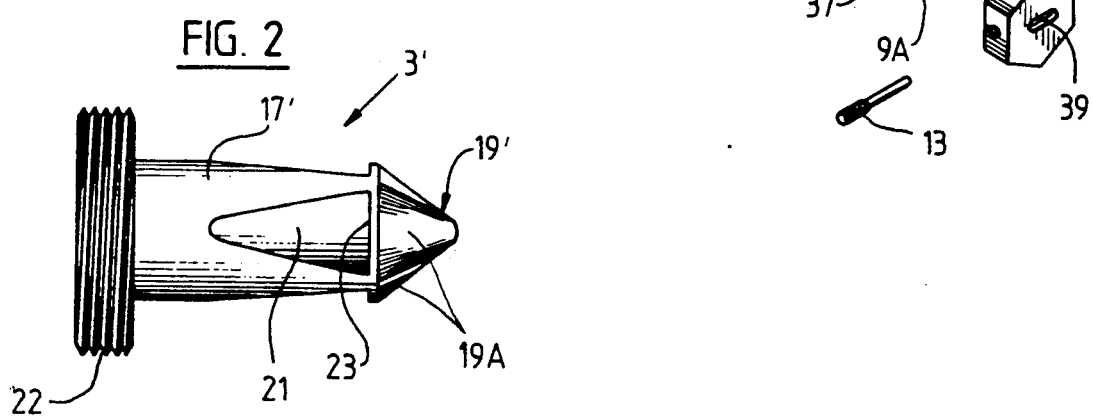
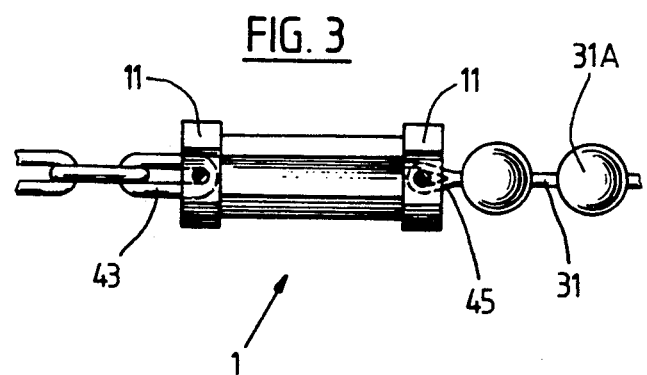
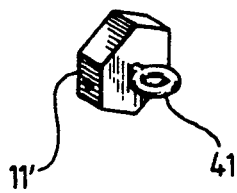
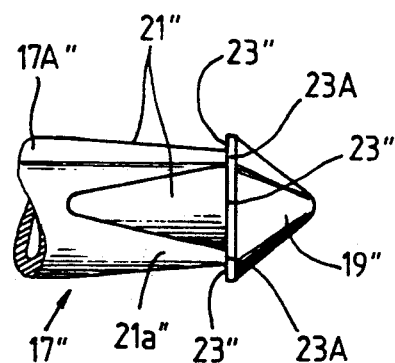

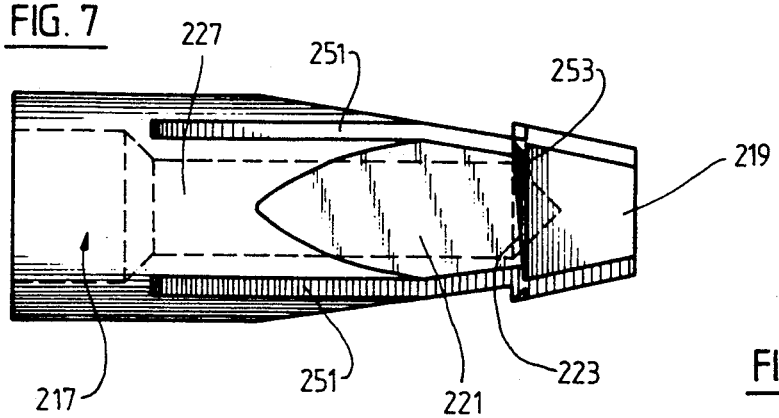
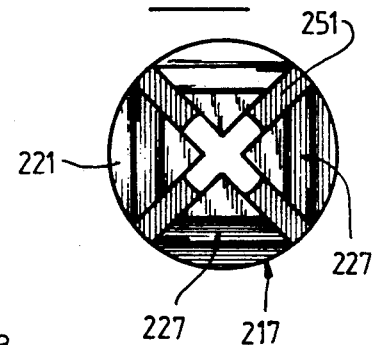
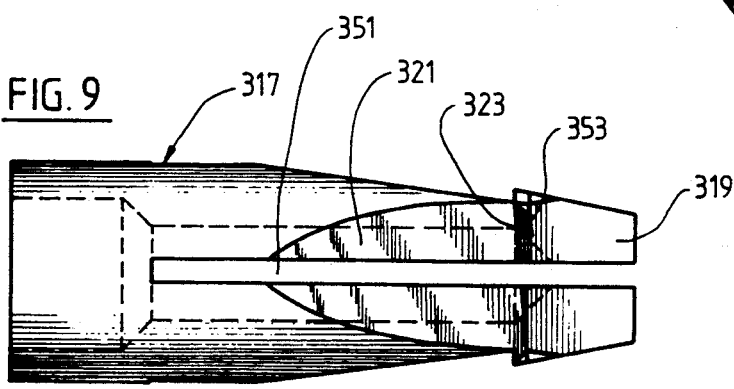
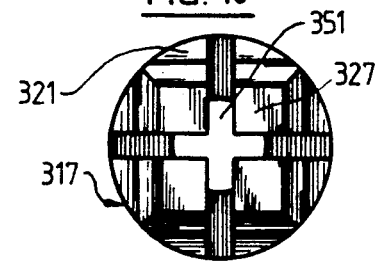
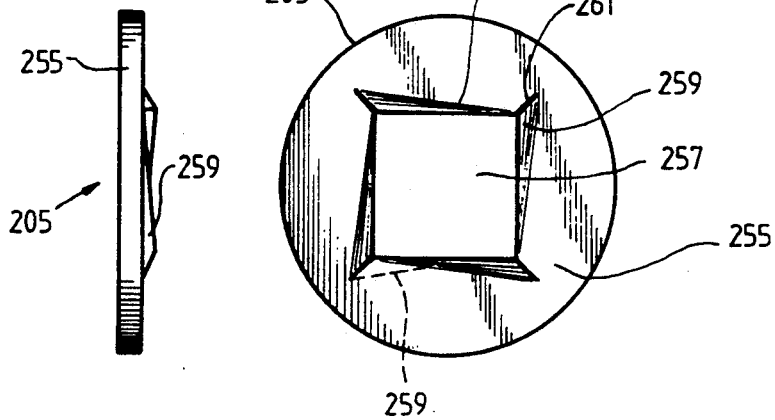

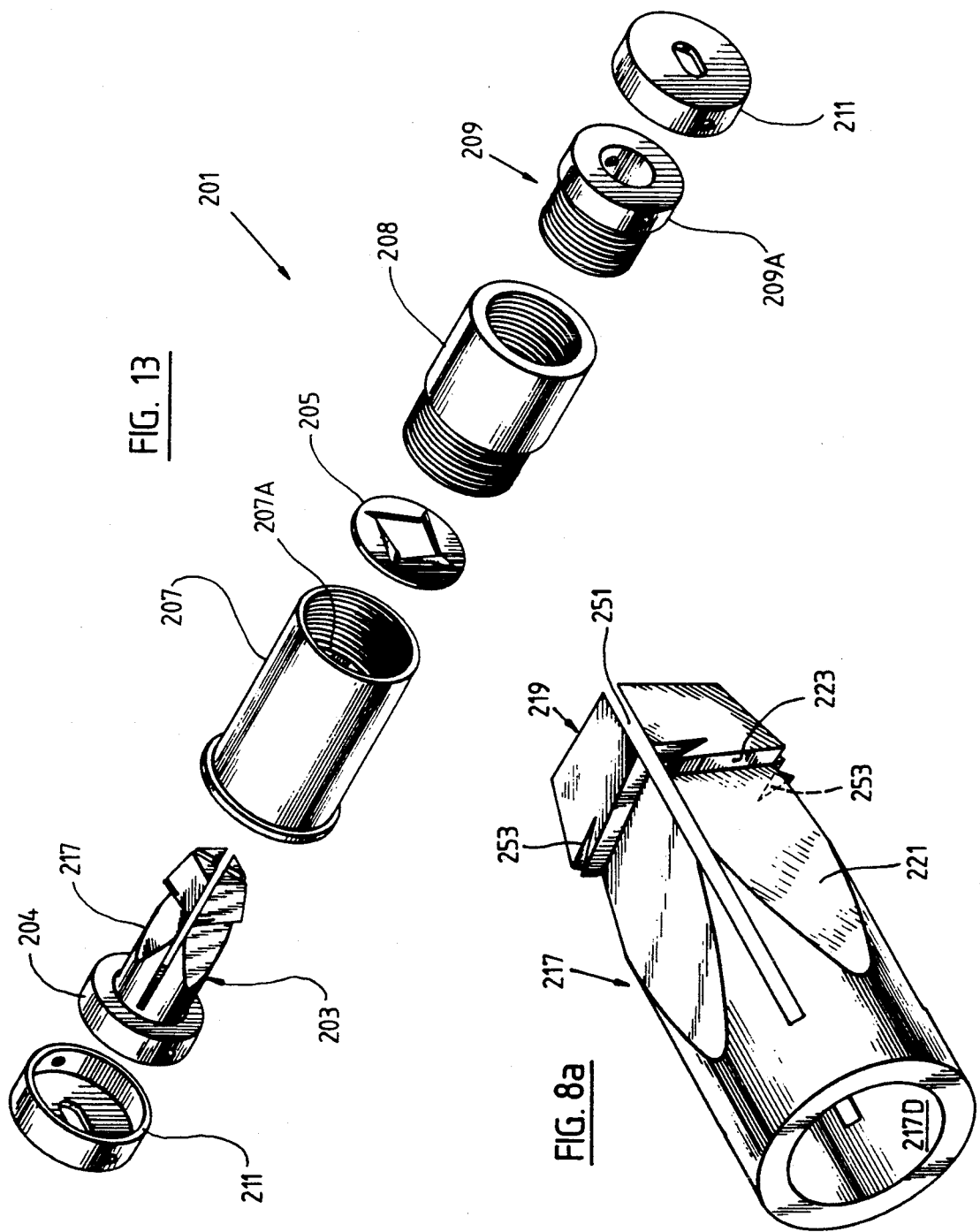

COUPLING DEVICE FOR USE AS A CLASP OR THE LIKE

BACKGROUND OF THE INVENTION

The invention relates to coupling devices in general, and more particularly to improvements in coupling devices which can be utilized with advantage as clasps or catches on bracelets, necklaces and other articles of jewelry.

Clasps or catches are used on chains, necklaces, bracelets, watchbands, straps and other articles of jewelry to permit the establishment or termination of a separable connection. Reliability of such clasps or catches is of great importance, especially when used on expensive articles of gold, silver or platinum jewelry. Moreover, such coupling devices must have an eye-pleasing appearance and should be manipulatable with a minimum of effort and regardless of whether or not they are visible to the eyes of the user during engagement or disengagement of their separable parts. Many presently known clasps employ slidable, turnable pivotable and/or otherwise movable male parts in the form of pins, studs, hooks or arms which can be grasped by the nail of a finger or by two fingers for movement into or from engagement with an eyelet, a tube or another female part. Such conventional clasps are not entirely satisfactory, mainly because they cannot be readily manipulated when not in the field of vision, e.g., when a person wishes to release a clasp or catch at the back of her or his neck. An impatient person who is unable to rapidly engage or disengage a conventional clasp is likely to lose patience and to damage the clasp or is compelled to seek assistance from another person. Alternatively, the chain, bracelet, necklace or timepiece which is equipped with the clasp is not worn or remains on the body of the user at an inopportune time, e.g., when the user wishes to take a bath or to go to bed. German patent application No. 38 40 170 Al of Laatzen (published May 31, 1990) discloses a clasp which comprises a tubular female component and a male component having a laterally extending resilient arm. When the male component is inserted into the female component in a first angular position and is thereupon turned in the socket of the female component, the end face of its resilient arm is free to engage an internal surface of the female component and to thus prevent extraction of the male component. If the latter is to be extracted from the socket of the female component, at least one of the two components must be turned relative to the other component in order to disengage the end face of the resilient arm from the internal surface of the female component and to orient the male component in such a way that it can be pulled out of the socket. A drawback of the clasp which is disclosed by Laatzen is that the locking or retaining action of the female component is not sufficiently reliable. For example, one of these components can be accidentally turned relative to the other component to thus cause the male component to assume an angular position in which it can be extracted from the socket of the female component. Moreover, the person in charge of manipulating the clasp is not aware of the angular position of the male component in the female component, i.e., such person is not certain that the inserted male component is maintained in an angular position for withdrawal from the socket or in an angular position in which the end face of its resilient arm overlies the internal surface of the socket.

OBJECTS OF THE INVENTION

An object of the invention is to provide a clasp, a catch or an analogous coupling device which is more reliable than heretofore known coupling devices in that its separable components are less likely to be accidentally detached from each other.

Another object of the invention is to provide a coupling device which is of eye pleasing appearance and can be used with advantage on chains, bracelets, watchbands, necklaces and similar articles of jewelry.

A further object of the invention is to provide a novel and improved male component for use in the above outlined coupling device.

An additional object of the invention is to provide a novel and improved female component for use in the above outlined coupling device.

Still another object of the invention is to provide an article of jewelry which embodies one or more coupling devices of the above outlined character.

A further object of the invention is to provide a coupling device which can be used with advantage as a superior substitute for conventional clasps or catches in existing articles of jewelry.

An additional object of the invention is to provide the coupling device with novel and improved means for separably securing its components to the ends of chains, bands, wires, ropes or the like.

Another object of the invention is to provide a coupling device which comprises a small number of simple and inexpensive parts.

An additional object of the invention is to provide a novel and improved method of manipulating the above outlined coupling device.

A further object of the invention is to provide a coupling device which can stand long periods of repeated use and which can be put to use in articles of jewelry as well as in many other articles which serve a purely utilitarian purpose.

Still another object of the invention is to provide a coupling device which can be furnished in any one of a number of different sizes and/or shapes and whose manipulation necessitates the exertion of a minimal force even though its locking or retaining action is highly reliable.

Another object of the invention is to provide a coupling device wherein the male component is automatically locked in the female component as soon as the male component is introduced into the female component so that the person in charge need not inspect or test the device for reliability of the locking action once the male component has been introduced into the female component.

SUMMARY OF THE INVENTION

The invention resides in the provision of a clasp, a catch or an analogous coupling device which comprises a male component including an end portion and having a facet and a first shoulder between the facet and the end portion, and a female component having a passage for the end portion and a second shoulder at the passage. The end portion of the male component is insertable into the passage of the female component to move the first shoulder past the second shoulder, and the male and female components are rotatable relative to each other to move the shoulders to and from predetermined positions of alignment with each other in the inserted position of the end portion. One of the male and female components has a resilient energy storing section which includes the respective shoulder and which causes the respective shoulder to overlap the other shoulder when the shoulders assume the predetermined positions. The other component has a stressing portion which disengages the shoulders by causing the resilient section to store energy in response to rotation of the components to move the shoulders from the predetermined positions and to thus permit extraction of the end portion of the male component from the female component.

The male component can include a shank having a tip which constitutes the end portion of the male component. The shank has a peripheral surface which includes the facet and the first shoulder as well as the stressing means if the energy storing section is provided on the female component. The tip of the shank can taper in a direction away from the facet and can have a base which is adjacent the first shoulder. The shank can constitute an elongated cylinder having a central axis, and the facet can slope toward the central axis in a direction toward the tip of the shank.

The female component can include a tube, and the resilient section can be rigid with such tube and extends into the passage. Such resilient section can include a leaf spring having an edge face which constitutes or comprises or forms part of the second shoulder. The cylindrical or polygonal wall of the tube can include a portion which constitutes the leaf spring.

Alternatively, the female component can include a longitudinally slotted tube having a plurality of prongs each of which constitutes a resilient section and each of which has a second shoulder. For example, the tube can comprise two prongs which can be disposed diametrically opposite each other and can be mirror images of one another. The male component can comprise a facet and a first shoulder for each prong of the female component.

The resilient section can form part of the male component. For example, the male component can include an elongated shank having at least one longitudinally extending slot which subdivides the respective part of the shank into a plurality of resilient sections each having a facet and a first shoulder and each including a part of the end portion. The end portion of the shank can have a substantially V-shaped notch at each of the first shoulders, and the female component then comprises a cam- or ramp-shaped stressing portion for each of the notches. The stressing portions enter the notches in inserted position of the end portion of the shank to reduce the size of the end portion for extraction of the end portion of the shank from the female component in response to rotation of the components relative to each other. The notches can constitute helical grooves. The passage of the female component is preferably congruent with the end portion of the shank and has a cross-sectional area which at most equals the cross-sectional area of the end portion of the shank in undeformed condition of the resilient sections.

The stressing portions can surround the passage of the female component and are preferably inclined relative to the plane of the passage. This passage can be provided in a disc- or washer-like part of the female component.

The first shoulder or shoulders can be disposed in a plane which is normal to the axis of rotation of the male component. Alternatively, each first shoulder can be located in a discrete plane which makes an oblique angle with the axis of rotation of the male component.

Each of the two components can be provided with a head having a recess and a substantially radially extending hole or bore which communicates with the respective recess. The bores or holes can receive pins, and the length of the pins is selected in such a way that the pins have portions which extend into the respective recesses to releasably engage and hold the loop or link at the end of a string, rope, cable or chain. The coupling device can further comprise caps which overlie the heads and have holes registering with the holes or bores of the respective heads. The caps can be a press fit on the respective heads; alternatively, at least one of the caps can be provided with internal threads which mate with the external threads of the respective head.

The novel features which are considered as characteristic of the invention are set forth in particular in the appended claims. The improved coupling device itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is an exploded perspective view of a coupling device which embodies one form of the invention and wherein the female component is assembled of three separately produced parts;

FIG. 2 is an enlarged side elevational view of a modified male component which can be utilized with the female component of the coupling device of FIG. 1;

FIG. 2a is a fragmentary elevational view of a portion of a male component constituting a modification of the structure shown in FIG. 2;

FIG. 3 is a side elevational view of the assembled coupling device, one of its components being connected to one end of a chain and the other of its components being connected to one end of a necklace or bracelet;

FIG. 4 is a perspective view of a modified cap or lid which can be utilized with the male or female component of the improved coupling device;

FIG. 7 is an enlarged side elevational view of a portion of a different male component;

FIG. 8 is an end elevational view of the portion of the male component as seen from the right-hand side of FIG. 7;

FIG. 8a is a perspective view of the portion of the male component of FIGS. 7 and 8;

FIG. 9 is an enlarged side elevational view of a portion of a male component which constitutes a modification of the structure shown in FIGS. 7 and 8;

FIG. 10 is an end elevational view of the portion of the male component of FIG. 9;

FIG. 11 is a side elevational view of a disc-shaped portion of a female component which can be utilized in conjunction with the portion of the male component of FIGS. 7 to 8a or with the portion of the male component of FIGS. 9-10;

FIG. 12 is an end elevational view of the portion of the female component of FIG. 11; and FIG. 13 is an exploded perspective view of a coupling device which employs the portion of the male component of FIGS. 7-8a and the portion of the female component of FIGS. 11-12.

DESCRIPTION OF PREFERRED EMBODIMENTS

Figure 5:
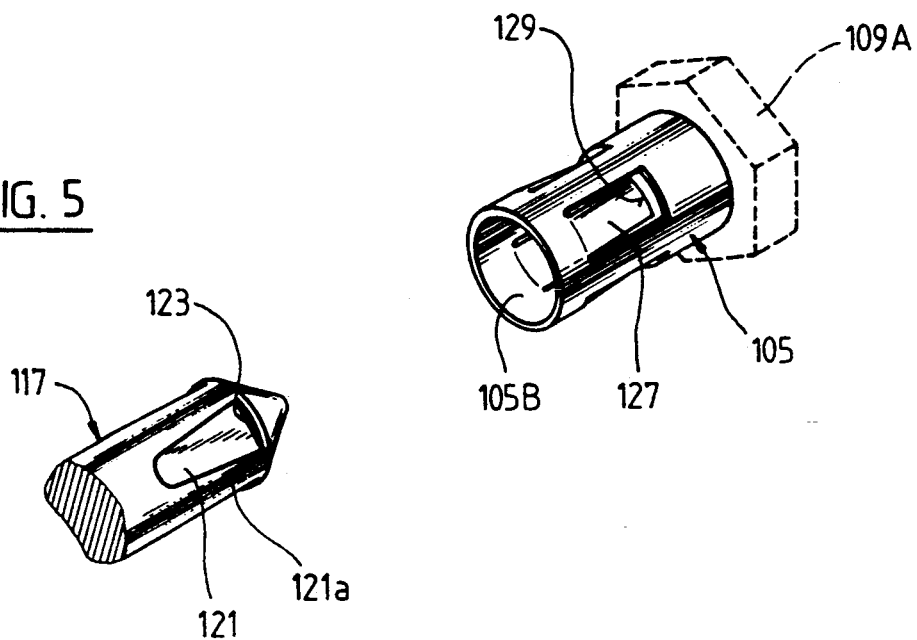
FIG. 5 is a fragmentary exploded perspective view of a further coupling device with a modified female component.

FIG. 1 shows the constituents of a coupling device 1 which can be utilized as a clasp to separably connect the ends of a chain, necklace or another piece of jewelry. The improved coupling device comprises a male component 3 including an elongated plunger or shank 17 having a cylindrical peripheral surface 17A, and a female component including an elongated tube 5 having four axially parallel slots 5A alternating with four resilient sections 27 in the form of elongated prongs which can store energy by being flexed outwardly, i.e., away from the axis of the tube 5. The female component further comprises a cylindrical housing or shell 7 for the resilient sections or prongs 27 of the tube 5, and a connector 9 which is shown as a discrete part but can constitute an integral portion of the housing or shell 7. If the coupling device 1 is used to connect two ends of an elongated piece of jewelry, the appearance of its male and female components can be enhanced, or such components can be concealed, by a first cap or lid 11 which can be applied over the polygonal head 4 of the shank 17, a second cap or lid 11 which can be applied over the polygonal head 9A of the connector 9, and a sleeve (not shown) which can be slipped onto the housing or shell 7. The caps 11 and the just mentioned sleeve can be made of, or plated with, a noble metal such as gold, silver or platinum. The sleeve can be omitted if the housing or shell 7 is made of or is plated with a film of noble metal.

One of the caps 11 can be removably affixed to the head 4 of the shank 17 by a fastener in the form of a pin 13 having an externally threaded portion and a bare portion and being insertable through a hole 11A in the respective cap 11 to extend into a tapped hole or bore 15 in the head 4. A second pin-shaped fastener 13 is used to separably connect the other cap 11 to the polygonal head 9A of the connector 9.

The head 4 can have a hexagonal outline and is disposed at that end of the shank 17 which is remote from a conical, hemispherical or similarly configurated end portion or tip 19 of the shank. The latter is preferably hollow; it is provided with an axially extending blind bore or hole 17B which has an open end within the head 4. The cylindrical peripheral surface 17A of the shank 17 has four equidistant elongated facets 21 which taper toward the axis of the shank in a direction toward the tip 19, and each such facet 21 terminates at a substantially radial shoulder 23 which is adjacent the base of the tip 19 and extends circumferentially of the shank 17. In the coupling device 1 of FIG. 1, the four shoulders 23 are located in a common plane which is normal to the axis of the shank 17. However, it is equally possible to dispose each shoulder 23 in a plane which is not exactly normal to the axis of the shank 17. The facets 21 alternate with axially parallel stressing portions 21a of the peripheral surface 17A. One end of each such stressing portion 21a merges into the external surface of the tip 19 in the region between the two neighboring shoulders 23. In the embodiment of FIG. 1, the front ends of the stressing portions 21a of the peripheral surface 17A merge gradually into the adjacent portions of the external surface of the tip 19. The width of each stressing portion 21a at the base of the tip 19 can be a small fraction of the width of the adjacent front portion of a facet 21. The facets 21 may but need not be flat, i.e., each of these facets can constitute a concave or convex portion of the peripheral surface 17A, as long as it can define with the tip 19 a clearly defined shoulder 23 which can be properly engaged by a complementary second shoulder or edge face 29 of a resilient section 27 of the tube 5. The latter defines an axial passage 5B for reception of the shank 17 of the male component 3. The shank 17 is automatically coupled to and is reliably retained in the tube 5 as soon as its tip 19 has been advanced beyond the shoulders 29 of the stressing sections 27; this takes place after the tip 19 has caused the sections 27 to store energy. These sections are free to dissipate energy and to move their shoulders 29 to positions of overlap with the adjacent shoulders 23 of the properly inserted shank 17 as soon as the tip 19 has been advanced beyond the common plane of the shoulders 29, i.e., beyond the passage 5B.

As mentioned above, the tip or end portion 19 of the shank 17 can constitute a hemisphere (this is shown in FIG. 1). FIG. 2 shows that the tip 19' of a shank 17' can have a substantially conical shape, e.g., the shape of a cone with a plurality of lobes 19A tapering in a direction from the base toward the apex of the tip 19'. Each lobe 19A can be aligned with one 20 of the shoulders 23, i.e., with one of the facets 21.

FIG. 2a shows that the stressing portion 21a" of the peripheral surface 17A" of a shank 17" need not merge into the external surface of the tip (here shown as a conical tip 19") with a smooth transition; instead, there is provided a relatively small step 23A which is disposed between the neighboring shoulders 23" (alternating with facets 21") and ensures the person in charge of extracting the shank 17" from the tube 5 must exert a certain force even at a time when the angular positions of the shank 17" and tube 5 relative to each other are such that the shoulders 23" are not aligned with the shoulders 29. The shoulders 29 on the resilient sections 27 of such tube are preferably rounded or chamfered to ensure that the shank 17" of FIG. 2a can be extracted from the tube 5 with the exertion of a force which is greater than that required to extract the shank 17 of FIG. 1 but is not excessive, i.e., that the required force can be readily applied by a child or an adolescent as well as by a senior person or an invalid.

The pins 13 need not be designed to secure the caps 11 to the heads 4 and 9A if the shank 17' is provided with an externally threaded enlarged portion 22 (see FIG. 2) and if the polygonal head 9A is also replaced with an externally threaded enlarged end portion of the connector 9. The caps 11 are then simply provided with internal threads. The pins 13 then merely serve to separably connect the shank 17' to one end of a piece of jewelry or the like, and to separably secure the connector 9 to another end of such piece of jewelry. FIG. 3 shows, by way of example, that the shank including the head in the left-hand cap 4 is separably connected to the link 43 at one end of a chain, and that the connector including a head 9 in the right-hand cap 11 is separably coupled with a closed loop 45 at one end of a length of wire, rope or string 31, e.g., a string which carries a series of pearls 31A or gem stones. To this end, each of the caps 11 has an opening (note the slot-shaped opening 39 in the end wall of the right-hand cap 11 in FIG.

1) to permit introduction of the link 43 or loop 35 into the recess 35 in the head 9A of the connector 9 or into a similar recess in the head 4 of the shank 17. The bare portion of the properly inserted pin 13 extends through the link 43 or through the loop 35 to thus ensure separable but reliable retention of the link or loop in the respective component of the improved coupling device 1.

The slots 39 can be omitted if the caps (note the cap 11' of FIG. 4) are provided with eyelets 41, loops, rings or similar accessible elements which can be connected with the links of chains or with the ends of wires, ropes, strings or the like.

Referring again to FIG. 1, the tube 5 has an external thread 25 at that end which is remote from the shoulders 29 of the resilient sections 27 and can mate with the internal threads (not shown) at the respective end of the housing 7. The other end of the housing 7 has an internal thread 33 which can mate with the external thread 34 of the connector 9. Thus, when the housing 7 is assembled with the connector 9 and with the tube 5, these parts together form a composite female component wherein the resilient sections 27 are confined in the housing 7.

FIG. 1 further shows that the tube 5 has a washer- or flange-like stop 37 which is adjacent the externally threaded portion 25 and cooperates with a ring-shaped or flange-like stop 37 of the connector 9 to abut the respective end faces of the aforementioned sleeve if such sleeve is provided to conceal the housing 7. The sleeve is or can be made of or plated with a noble metal, the same as the caps 11, in order to ensure that the appearance of the assembled coupling device 1 does not detract from the appearance of the article of jewelry in which the coupling device is put to use.

FIG. 1 also shows that the tube 5 is provided with a helical internal track 30 which serves as a guide in that it can cause the shank 17 to turn during introduction into the passage 5B to thus ensure that the shoulders 23 will automatically overlap the adjacent shoulders 29 as a result of radially inward movement of the shoulders 29 as soon as the tip 19 of the shank 17 has been caused to advance beyond the passage 5B. Thus, and in contrast to the aforediscussed clasp of Laatzen, the improved coupling device 1 ensures that the shank 17 is automatically locked in the female component 5, 7, 9 as soon as the tip 19 has penetrated into the housing 7 beyond the passage 5B of the tube 5. At such time, those portions of the resilient sections 27 which are adjacent the respective shoulders 29 are also adjacent the respective facets 21, i.e., each shoulder 23 overlies one of the shoulders 29 and thus prevents unintentional extraction of the shank 17 from the tube 5.

In order to disengage the shank 17 of the male component 3 from the tube 5 of the female component 5, 7, 9, a person simply turns one of the caps 11 relative to the other cap 11 and/or vice versa, through an angle of approximately 45° whereby the stressing portions 21a of the peripheral surface 17A of the shank 17 engage the inner sides of the respective resilient sections 27 at the corresponding shoulders 29 to cause the sections 27 to store energy by moving their shoulders 29 radially outwardly. The width of the passage 5B at the shoulders 29 is thereby enlarged so that the resilient sections 27 permit the tip 19 to enter the passage 5B and to be extracted from the tube 5 in a direction to the left, as viewed in FIG. 3.

If the number of facets 21, shoulders 23, resilient sections 27 and shoulders 29 is reduced to three, the shank 17 must be turned through approximately 60° before the tip 19 can reenter the passage of the tube to thus permit separation of the female and male components from each other.

When the resilient sections 27 of the tube 5 are free to dissipate at least some energy, i.e., when they are free to assume the positions which are shown in FIG. 1, their shoulders 29 preferably define a polygonal (square) end of the passage 5B. Such end of the passage has a triangular shape if the tube 5 includes three resilient sections. The illustrated shoulders 29 are located in a common plane which is normal to the axis of the tube 5.

The resilient sections 27 can constitute separately produced parts which are welded, soldered or otherwise reliably affixed to the other portion of the tube 5, i.e., to the portion which includes the stop 37 and the external thread 25.

That portion of the passage 5B in the tube 5 which is spaced apart from the shoulders 29 has a diameter which is at least slightly greater than the diameter of the peripheral surface 17A of the shank 17 so that the latter can be readily introduced into the passage 5B and a certain force must be applied only while the tip 19 is in the process of advancing past the shoulders 29, i.e., beyond the passage 5B.

The improved coupling device 1 can be used in connection with the aforediscussed as well as many other articles of jewelry (e.g., with brooches). For example, a brooch can be affixed to the housing 7 or to the aforediscussed sleeve and separably connected to the ends of a chain or the like, e.g., a gold chain.

The recess 35 can constitute a through bore or hole in the connector 9 or a blind bore or hole which is bounded by a cylindrical or a concave internal surface. The same applies for the (non-illustrated) recess in that end of the shank 17 which carries the head 4.

Though it is possible to make all individual parts of the improved coupling device from a noble metal, it is often preferred to make the shank 17, the pins 13, the tube 5 and the connector 9 from a material (such as steel) which can stand pronounced stresses for long periods of use. If the utilization of parts which are made of a material other than a noble metal would detract from the appearance of the article of jewelry in connection with which the coupling device is put to use, the just described parts are simply concealed within an envelope which includes the caps 11 and the housing 7 or the caps 11 and the aforementioned sleeve (if the housing is not made of a noble metal).

The stops 37 can be used to abut the end faces of the aforementioned sleeve and/or the end faces of the housing 7. This enables the person in charge of assembling the coupling device 1 to ascertain that the external threads 25, 34 are in proper mesh with the corresponding internal threads 33 of the housing 7.

The person in charge of detaching the shank 17 from the tube 5 can immediately realize that the shank is ready for extraction from the tube, namely that the shoulders 23 are no longer aligned with the shoulders 29, because turning of the shank and/or of the tube to the corresponding angular position necessitates the exertion of certain force, i.e., the person in charge of manipulating the coupling device 1 notes that the resistance rises and is thus informed that the shank is ready for separation from the female component. The angular positions of the shank 17 and tube 5 relative to each other prior to insertion of the shank need not be considered because the track 30 ensures that each shoulder 23 is aligned with and is overlapped by a shoulder 29 as soon as the tip 19 of the shank has been caused to advance beyond the passage 5B.

A somewhat greater force is required to extract the shank 17" of FIG. 2a from a tube 5 because the shoulders or edge faces 29 (which are preferably rounded or chamfered) of the resilient sections 27 must ride over the small shoulders 23A at the time the shoulders 23" are no longer overlapped by and aligned with the shoulders 29.

The resilient sections 27 can be replaced with composite sections which include resilient and rigid portions. For example, each resilient section can include a leaf spring (not shown) which is integral with or is affixed to the parts 25, 37 of the tube 5 and a rigid portion which is provided with a shoulder 29 and is welded, soldered, riveted or otherwise securely affixed to the leaf spring. All that counts is to ensure that the resilient sections 27 or their equivalents exhibit a tendency to move the respective shoulders 29 radially inwardly and into the path of movement of the tip 19 when the latter is caused to advance into, through and beyond the passage 5B.

FIG. 5 shows a tube 105 which forms a modified part of a composite female component and cooperates with a male component including a shank 117. The resilient sections 127 are leaf springs which constitute inwardly bent portions of the cylindrical wall of the tube 105 and have edge faces or shoulders 129 serving to perform the functions of the shoulders or edge faces 29 on the resilient sections 27 of the tube 5 shown in FIG. 1.

FIG. 5 further shows by broken lines that the connector 9 of FIG. 1 can be omitted, i.e., the head 109A (replacing the head 9A) can be made an integral part of the tube 105. This contributes to simplicity and lower cost of the coupling device which employs the tube 105 and the shank 117 of FIG. 5. The shank 117 is or can be identical with the shank 17 of FIG. 1; it also comprises facets 121, shoulders 123 and stressing portions 121a. The axial passage of the tube 105 is shown at 105B.

Figure 6:
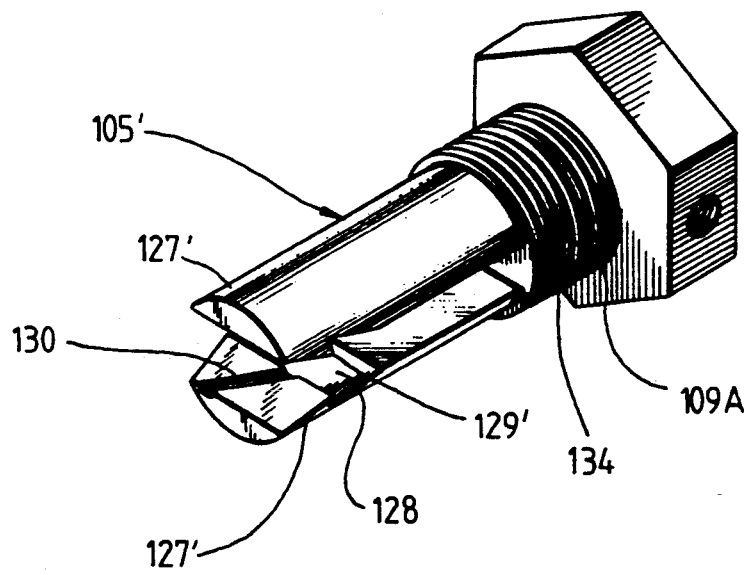
FIG. 6 is an enlarged perspective view of a female component constituting a modification of the female component of FIG. 5.

Referring to FIG. 6, there is shown a part of a female component which constitutes a modification of the structure in the right-hand part of FIG. 5. The female component includes a longitudinally slotted tube 105' one end of which is provided with an external thread 134 replacing the external thread 34 of the connector 9 in the coupling device 1 of FIG. 1, and with a polygonal head 109A replacing the head 9A of the connector 9. Thus, the part which is shown in FIG. 6 can be threaded into one end portion of a housing 7 (not shown in FIG. 6) to constitute therewith a female component which can receive the shank 17, 17' or 117 of a male component, not shown.

The tube 105' comprises two resilient sections 127' which are disposed opposite each other and are or can be mirror images of one another. The internal surfaces of the sections 127' have transversely extending recesses 128 to define shoulders 129' performing the function of the shoulders 29 or 129. The recesses can have a wedge-shaped or similar cross-sectional outline. The character 130 defines a guide or track for the shank (not shown in FIG. 6).

The number of resilient sections which form the tube 105' can be increased to three or more without departing from the spirit of the invention.

FIGS. 7, 8 and 8a show a shank 217 which can constitute or form part of a male component 203 (FIG. 13) and is hollow. Its axial bore or hole 217D communicates with four axially parallel equidistant slots 251 which alternate with resilient sections 227. The end portion or tip 219 of the shank 217 resembles a hollow truncated pyramid and defines with the adjacent portion of the shank a set of four shoulders 223 disposed in planes which make oblique angles with the axis of the shank. The tip 219 is further provided with four relatively short V-shaped notches or grooves 253 each of which is open at one of the slots 251 and forms part of a helix (see particularly FIG. 8a). The shank 217 has four identical resilient sections 227 because the four slots 251 are disposed (in pairs) in two planes which are normal to each other and cross each other along the longitudinal axis of the shank. Each resilient section 227 is formed with a facet 221 which begins at the respective shoulder 223 and extends toward but short of the opposite end of the shank 217. The entire shank 217 can be made of spring steel or another material which is selected with a view to ensure that the sections 227 exhibit at least some resiliency and can be flexed toward the axis of the shank in order to reduce the width of the slots 251 and to thus reduce the size of the tip 219. This renders it possible to cause the tip 219 to pass through the substantially square central passage 257 of a disc-shaped part 205 (hereinafter called disc for short) of the female component of the coupling device 201 (FIG. 13) including the shank 217. The disc 205 is shown in FIGS. 11, 12 and 13 and further comprises four shoulders 229 which are adjacent the edges bounding the passage 257. The disc 205 further comprises four stressing portions in the form of ramps or cams 259 which are adjacent the shoulders 229 and are obtained by bending substantially triangular elongated portions out of the general plane of the disc 205 (see FIG. 11). Such cams can be formed by providing the disc 205 with substantially radially extending short slits 261 at the corners of the passage 257 and by thereupon bending the adjacent marginal portions out of the general plane of the disc. The inclination of the cams 259 relative to the plane of the disc 205 matches or approximates the inclination of the notches 253 relative to a plane which is normal to the longitudinal axis of the shank 217. The reference character 255 denotes in FIGS. 11 and 12 the non-deformed major portion of the disc 205.

The cams 259 of the disc 205 can be said to constitute straightened out portions of an external thread and the notches 253 can be said to constitute straightened out portions of a helical cam groove. The number of shoulders 229 and cams 259 equals m times n wherein m is the number of facets 221 and n is a whole number including one.

It is possible to modify the tip 219 of the shank 217 by providing it with a total of eight notches 253. A fifth notch 253 is indicated in FIG. 8a by broken lines. The disc 205 is then provided with a total of eight stressing portions or cams 259. A fifth cam 259 is indicated in FIG. 12 by broken lines.

The cross-sectional area of the passage 257 in the disc 205 at most matches but is normally slightly smaller than the maximum cross-sectional area of the tip 219 in undeformed (unstressed) condition of the resilient sections 227. This ensures that the size of the tip 219 must be at least slightly reduced during advancement of the tip through the passage 257 in either direction. Thus, the sections 227 must yield, at least slightly, when the tip 219 is to advance through the passage 257 in a direction from the left, as seen in FIG. 11, and the sections 227 must yield again if the shank 217 is to be extracted from the disc 205 by causing the tip 219 to advance through the passage 257 in a direction from the right to the left, again as seen in FIG. 11.

The purpose of the cams 259 is to enter the adjacent notches 253 during extraction of the shank 217 from the disc 205, namely during advancement of the tip 219 toward and into the passage 257, whereby the cams 259 cause a certain deformation of the sections 227 in a sense to reduce the cross-sectional area of the tip 219 so that the latter can enter into and advance through and out of the disc 205.

The tip 219 can be introduced into the passage 257 in any one of four different angular positions because its cross-sectional outline is a rectangle, i.e., it is congruent with the cross-sectional outline of the passage 257. As the tip 219 is being pushed into the passage 257, the resilient sections 227 of the shank 217 are caused to store energy, i.e., they are deformed and thereby reduce the width of the slots 251. Once the tip 219 has advanced beyond the passage 257 so that the latter receives the adjacent portion of the shank 217 at the shoulders 223, the sections 227 are free to move apart and thus move their shoulders 223 into positions of overlap with the adjacent shoulders 229 of the disc 205. If necessary, the shank 217 automatically carries out a certain amount of angular movement relative to the disc 205 and/or vice versa while the sections 227 move apart, and such angular movement ensures that each of the shoulders 223 on the sections 227 overlies a shoulder 229 of the disc 205.

In order to thereupon extract the shank 217 from the disc 205, the disc is turned relative to the shank and/or vice versa so that the notches 253 slide along the respective cams or ramps 259 and the cams 259 thereby cause the sections 227 to store energy, i.e., the cross-sectional area of the base of the tip 219 is reduced sufficiently to ensure that the tip can be extracted by moving through the passage 257 of the disc 205. In other words, turning of the disc 205 relative to the shank 217 and/or vice versa causes the shank to act not unlike the externally threaded part of a screw or bolt, and the passage 257 can be said to constitute the equivalent of a tapped bore or hole which ensures that the shank 217 can move axially to an extent which is necessary to reduce the cross-sectional area of the base (at the shoulders 229) of the tip 219 so that the tip can readily advance through the passage 257. In the embodiment which employs the shank 217 of FIGS. 7 to 8a and the disc 205 of FIGS. 11 and 12, the shank 217 can be rotated relative to the disc 205 (or vice versa) in a single direction, and such rotation takes place by overcoming the resistance of the resilient sections 227 to store energy (or to store additional energy), i.e., to permit a reduction of the cross-sectional area of the tip 219.

FIG. 13 shows certain additional parts of the coupling device 201 which employs the shank 217 of the male component 203) and the female component including the disc 205. The coupling device 201 further comprises two cylindrical caps or lids 211, an internally threaded housing or shell 207 for the disc 205, a hollow cylindrical retainer 208 which is to be threaded into the housing 207 in order to maintain the disc 205 in a predetermined axial position in which the disc 205 abuts an internal shoulder 207A of the housing, and a connector 209 which can be threadedly connected with the retainer 208. The caps 211 are functional equivalents of the caps 11 and can be releasably secured to the cylindrical head 204 of the male component 203 and to the cylindrical head 209A of the connector 209 by pins of the type shown at 13 in FIG. 1 or in any other suitable way.

The retainer 208 can be omitted if the disc 205 is glued or otherwise reliably secured to the housing 207 at predetermined distances from the axial ends of the housing. The externally threaded portion of the connector 209 is then threaded directly into the respective internally threaded end of the housing 207. Furthermore, the connector 209 can serve as a means for urging the main portion 255 of the disc 205 against the internal shoulder 207A of the housing 207, i.e., the connector 209 can perform the function of carrying one of the caps 211, the function of being connected to one end of an article of jewelry, and the function of the retainer 208.

FIGS. 9 and 10 illustrate a shank 317 which constitutes a modification of the shank 217 of FIGS. 7, 8, 8a and 13. The difference is that the slots 351 of the shank 317 do not alternate with but rather halve the facets 321. This causes the shank 317 to exhibit a hollow frustoconical end portion or tip 319 composed of the four free ends of resilient sections 327 and having shoulders 323 which can cooperate with the shoulders 229 of the disc 205 in the same way as described above in connection with the resilient sections 227 and tip 219 of the shank 217. The tip 319 has four notches 353 which serve the same purpose as the notches 253 of the tip 219, i.e., they cooperate with the cams or ramps 259 of the disc 205 to permit extraction of the tip 319 through the passage 257 when the shank 317 is used in lieu of the shank 217.

All embodiments of the improved coupling device share the feature that the male component is reliably locked in the female component as soon as the shoulders of the male component advance beyond the shoulders of the female component. Furthermore, all embodiments of the coupling device share the feature that a certain amount of rotation of the male component relative to the female component (and/or vice versa) must precede extraction of the male component from the female component, and such rotation must take place against the resistance of one or more resilient energy storing sections of one of the components. The number of energy storing sections can be reduced to one or increased to two, three, four or more. The retaining force which must be overcome for extraction of the male component is increased if the number of resilient sections on the male or female component is increased.

The improved coupling device is susceptible of many additional modifications without departing from the spirit of the invention. Furthermore, the coupling device is not intended for use solely in connection with articles of jewelry. For example, the dimensions of the coupling device can be selected in such a way that it can be used to separably connect one end of a door chain to a door or to a door frame. Two coupling devices can be used under similar circumstances, i.e., one to separably connect one end of a chain to a door and the other to separably connect the other end of the same chain to a door frame. In other words, the improved coupling device can be used to establish a separable connection between two ends of a flexible article (such as a chain, a bracelet or a necklace) or between a stationary part (e.g., a door frame) and a mobile part (such as a pivotable or slidable door panel).

The housing or shell (such as the housing 7 or 207) need not be a cylinder, and the coupling device need not employ polygonal (11) or cylindrical (211) caps. The configuration of these parts can be selected with a view to enhance the appearance or not to detract from the appearance of the coupling device, not only when the latter is used in connection with an article for jewelry but also when used for any other purpose, e.g., in conjunction with a safety chain on a door.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling device comprising a male component including an elongated shank having an end portion and at least one longitudinally extending slot subdividing said shank into a plurality of resilient energy storing sections each having a facet and a first shoulder between the respective first facet and said end portion, each of said sections including a part of said end portion and said end portion having a substantially V-shaped notch at each of said first shoulders; and a female component having a passage for said end portion and a second shoulder at said passage, said end portion being insertable into said passage to move said first shoulders past said second shoulder and said components being rotatable relative to each other to move said first shoulders and said second shoulder to and from predetermined positions of alignment with each other in the inserted position of said end portion, said resilient sections causing the respective first shoulders to overlap the second shoulder when said first shoulders and said second shoulder assume said predetermined positions, said female component having a cam-shaped stressing portion for each of said notches, said stressing portions disengaging said first shoulders from said second shoulder by causing said resilient sections to store energy in response to rotation of said components to move said first shoulders and said second shoulder from said predetermined positions and to thus permit extraction of said end portion from said female component, said stressing portions entering said notches in inserted position of said end portion to reduce the size of said end portion for extraction of said male component from said female component in response to rotation of said components relative to each other.

2. The device of claim 1, wherein said shank has a tip which constitutes said end portion, said shank further having a peripheral surface which includes said facets and said first shoulders.

3. The device of claim 2, wherein said tip tapers in a direction away from said facets and has a base adjacent said first shoulders.

4. The device of claim 2, wherein said shank is an elongated cylinder having a central axis and said facets slope toward said axis in a direction toward said tip.

5. The device of claim 1, wherein said notches are helical grooves.

6. The device of claim 5, wherein said passage is congruent with said end portion and has a cross-sectional area which at most equals the cross-sectional area of said end portion in undeformed condition of said resilient sections.

7. The device of claim 1, wherein said stressing portions surround said passage, said passage being disposed in a predetermined plane and said stressing portions being inclined relative to said predetermined plane.

8. The device of claim 1, wherein said male component has an axis of rotation and said first shoulders are located in a planes making an oblique angles with said axis of rotation.

9. The device of claim 1, wherein each of said components has a head and a recess in said head, each of said heads further having a hole communicating with the respective recess and further comprising pins having first portions received in said holes and second portions received in the respective recesses.

10. The device of claim 9, further comprising caps overlying said heads and having holes registering with the holes of the respective heads.

11. The device of claim 9, further comprising caps provided on said heads, at least one of said caps having an internal thread mating with an external thread of the respective head.

12. A coupling device comprising a male component including an end portion and having a facet and at least one first shoulder between said facet and said end portion; and a female component having a passage for said end portion and a plurality of second shoulders at said passage, said end portion being insertable into said passage to move said at least one first shoulder past said second shoulders and said components being rotatable relative to each other to move said at least one first shoulder and said second shoulders relative to each other to and from predetermined positions of alignment with each other in the inserted position of said end portion, said female component having at least three resilient energy storing sections which surround said passage and each of which includes one of said second shoulders and causes the respective second shoulder to overlap the at least one first shoulder when said shoulders assume said predetermined positions, said male component having stressing portions which disengage said second shoulders from said at least one first shoulder by causing said resilient sections to store energy in response to rotation of said components to move said shoulders from said predetermined positions and to thus permit extraction of said end portion from said female component.

13. The coupling device of claim 12, wherein said female component has four resilient sections.

14. The coupling device of claim 12, wherein said female component includes an externally threaded portion adjacent said resilient sections and remote from said second shoulders.

15. The coupling device of claim 12, wherein said male component has a discrete first shoulder for each of said second shoulders.

16. The coupling device of claim 15, wherein said male component includes an elongated shank having longitudinally extending slots subdividing said shank into a plurality of resilient sections each having a facet and a first shoulder and each including a part of said end portion.

* * * * *